Dec. 9, 1958  E. A. STALKER  2,863,633
HOLLOW BLADES AND MANUFACTURE THEREOF
Filed April 19, 1952  2 Sheets-Sheet 1
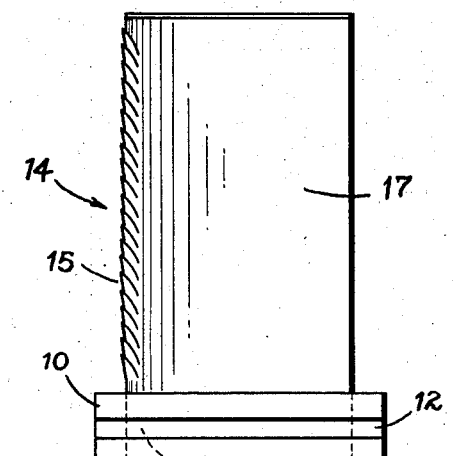
FIG-1
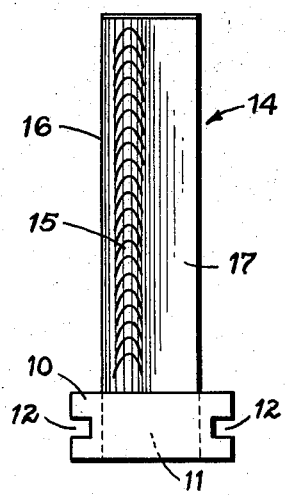
FIG-2
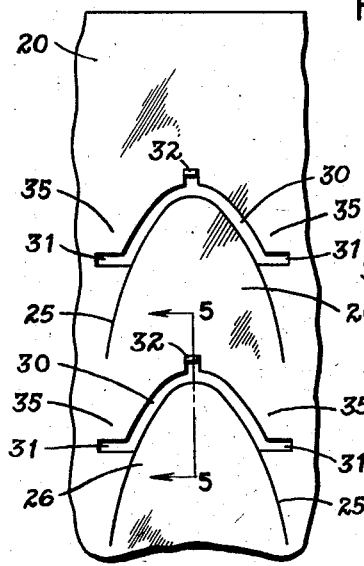
FIG-3
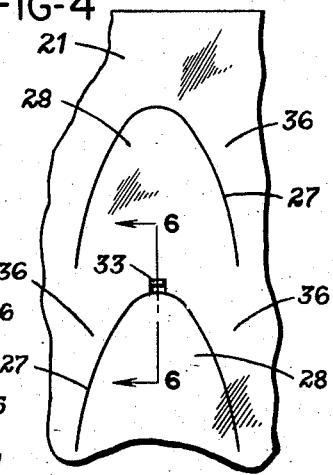
FIG-4
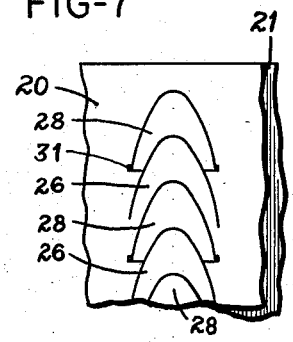
FIG-7
FIG-8
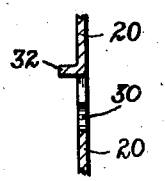
FIG-5
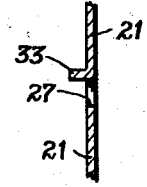
FIG-6
INVENTOR
EDWARD A. STALKER
BY
ATTORNEYS

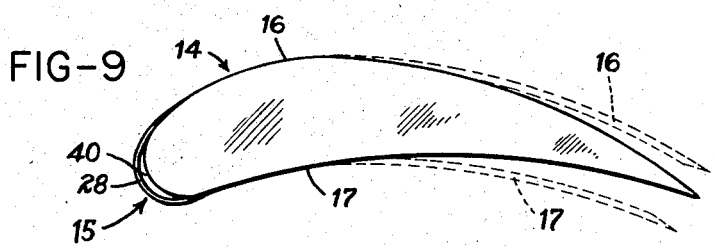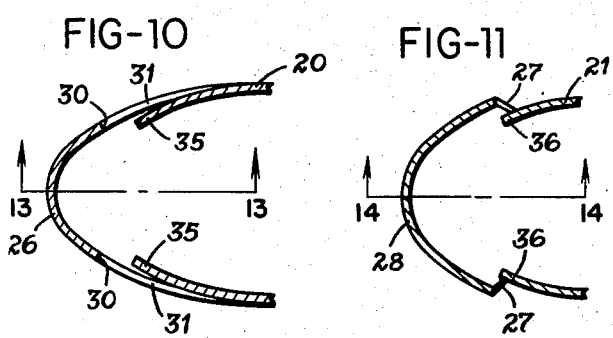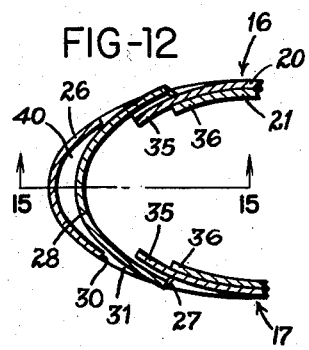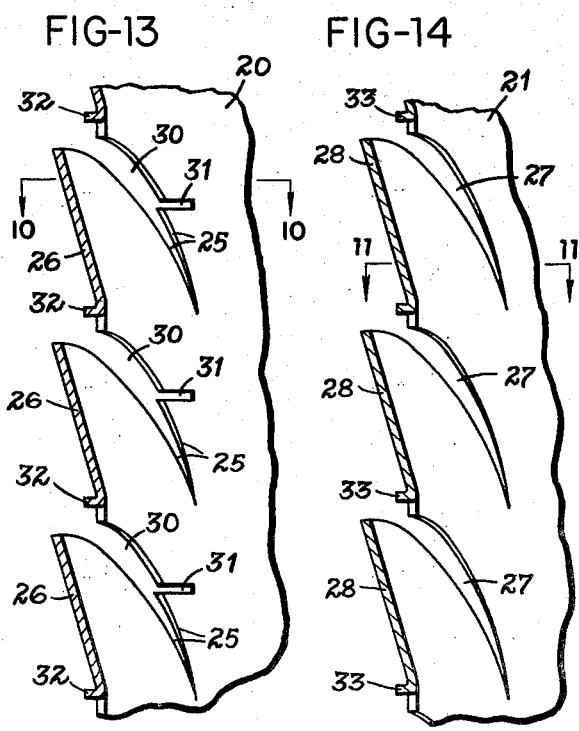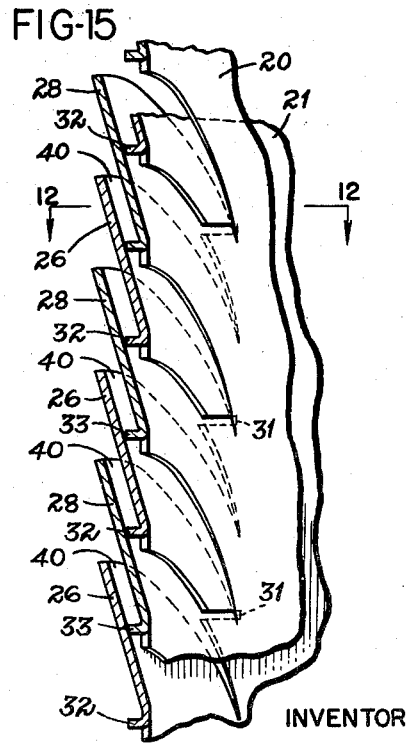

United States Patent Office 2,863,633
Patented Dec. 9, 1958

2,863,633

HOLLOW BLADES AND MANUFACTURE THEREOF

Edward A. Stalker, Bay City, Mich., assignor to The Stalker Development Company, Bay City, Mich., a corporation of Michigan Application April 19, 1952, Serial No. 283,160

8 Claims. (Cl. 253—39.15)

This invention relates to blades for turning or directing a flow of fluid, and more particularly to hollow blades, for compressors, turbines and the like, such for example as are adapted to operate in a hot motive fluid.

It is the principal object of the invention to provide a hollow blade for compressors, turbines and the like which can be made simply and economically from sheet metal, and which can be provided in a simple and easy way with a pattern of slots and flow passages in order to make it possible to cool the blade, particularly a nose portion thereof, by a flow of fluid supplied from the interior of the hollow blade.

It is a further object to provide such a blade which is simple in construction, which has adequate strength, and which is rugged and will withstand the severe stresses to which it is subject in use.

It is a further object to provide a method of forming blades of such character which can be carried out simply, rapidly and economically to produce blades of the contour desired.

Other objects and advantages will be apparent from the following description, the accompanying drawings and the appended claims.

In the drawings—

Figs. 1 and 2 are side and front elevational views respectively of a hollow blade construction in accordance with the present invention and mounted upon a suitable base;

Fig. 3 is an enlarged scale elevational view showing the pattern of slits which is made in one sheet or plate, the outer plate, in accordance with the invention;

Fig. 4 is a similar view showing the pattern of slits which is made in the other or inner sheet or plate;

Figs. 5 and 6 are sectional views on the lines 5—5 of Fig. 3 and 6—6 of Fig. 4, respectively;

Figs. 7 and 8 are elevational views looking toward the outside and inside respectively of the nose of the blade showing the two plates in assembled relation;

Fig. 9 is a plan view showing the finished blade contour and the intermediate step in the completion of the securing of the trailing ends of the blade walls to each other;

Fig. 10 is an enlarged sectional view through the nose portion of the outer blade plate, on the line 10—10 of Fig. 13;

Fig. 11 is a similar view through the nose portion of the inner plate on the line 11—11 of Fig. 14;

Fig. 12 is a view through the nose portion of the finished blade with the two plates superimposed, on the lines 12—12 of Fig. 15; and Figs. 13, 14 and 15 are sectional views on the lines 13—13 of Fig. 10, 14—14 of Fig. 11 and 15—15 of Fig. 12, respectively.

The fabrication of hollow blades for directing or turning a flow of fluid, such as for compressors, turbines and the like, presents considerable difficulty because of the severe conditions under which blades of this character are required to operate. They are subjected both to high centrifugal and other operating stresses and are also in many cases bathed by a hot gas flow at temperatures which are so high that even stationary blades would be injuriously affected. To afford protection for such blades against this high temperature condition, a pattern of slots may be provided preferably extending across the nose of the blade in such relation that flows of cooling fluid may be discharged from the slots in such manner as to form a protective film thereover, such protective film preventing direct impinging contact of the hot gas flow upon the blade surface in damaging relation thereto. A slotted blade construction of this character is disclosed in applicant's Patent No. 2,489,683, issued November 29, 1949, and another form of construction is shown in co-pending application Serial No. 784,457, filed November 6, 1947, now Patent 2,613,911.

In accordance with the present invention a blade of the general nature illustrated in Figs. 1 and 2 is provided which may comprise a base 10 having a flow passage 11 therethrough for delivery of a flow of cooling fluid or the like, the blade being suitably grooved as shown at 12 to provide for attachment in the turbine, compressor, or other device where it may form either a movable or stationary blade or fluid turning member. The blade itself is shown at 14 having a nose 15, an upper wall 16 and a lower wall 17, shaped as may be desired to define a particular blade contour. As shown in Fig. 9 the upper wall 16 is convex while the lower wall 17 is concave, but these shapes may be determined as desired for different blade contours.

The blade is formed of double wall construction and formed by two separate sheet metal plates. One such plate shown in Fig. 3 at 20 forms primarily the outer blade surface while a second such plate 21 is primarily upon the inner surface. The particular relation of the side or body portions 16 and 17 respectively of these two plates is of secondary importance, and they may be coextensive, or one may be tapered off into the other, as may be found most suitable, the present invention disclosing primarily the manner of forming the pattern of slots or flow passages which are located at the nose portion of the blade.

For this purpose, each plate is provided with a pattern of slits of generally arcuate shape. Upon plate 20, the slits are shown at 25, forming platelets 26 which are separated along their apex and sides, but with their base remaining integrally joined to the main body of the plate. This pattern of slits is located at an intermediate location on the plate 20, leaving sufficient material laterally thereof on either side to form the main body of the blade from the nose to the trailing edge.

On plate 21 the slits are shown at 27 defining the series of platelets 28, similarly shaped with platelets 26, and likewise integral with the main body of the plate. The spacing and shape of the two series of platelets are the same, but they alternate in their spanwise position as clearly appears from a comparison of Figs. 3 and 4.

The outer plate 20 is likewise formed with a pattern of slots shown at 30, by cutting out a small section of the material conforming to the upper portion of platelets 26 thereby enlarging the slits to form the slots 30. In addition the slots each include wings 31 which are produced to facilitate the interfitting of the platelets in the subsequent step of assembly of the two plates together.

Each plate is further formed with a pattern of spacers 32, 33, respectively, shown more in detail in Figs. 5 and 6. These spacers may be simply produced as tangs struck out at substantially right angles to the surface of each plate at the apex of each platelet, and are readily produced in the same forming operation that produces the slits and the slot enlargements thereof, by pressing a small portion of the plate forwardly.

The plates in this stage of fabrication are still essentially flat, and may then be readily shaped into the form of a blade by suitable sheet metal forming machinery which will locate the platelets at the nose and shape the upper and lower blade contour. The sheets are preferably formed separately but their trailing ends are left open, as shown in the dotted line outline of Fig. 9.

It is desirable to provide for deflecting the platelets so that they will lie at a relatively small angle to the plane of their respective plates. It is also desirable, to facilitate the assembly of the two plates together, to bend or deflect the walls of the plate adjacent the platelets in the opposite direction, i. e., inwardly of the hollow blade. This is conveniently carried out on suitable forming dies, the several platelets being deflected outwardly with their free ends projecting forwardly at a small angle to the spanwise line passing through the undeflected portions of the nose of the blade as shown in Figs. 13 to 15. At the same time the wall of the outer plate 20 adjacent the upper part of platelets 26, on each side thereof, and in the general area of reference numeral 35 of Fig. 3 is deflected inwardly, to approximately the position illustrated in Fig. 10. Similarly the material of plate 21 adjacent the upper portion of each side of platelets 28 is deflected inwardly as shown at 36 in Fig. 11.

The two plates are then superimposed upon each other the inner plate fitting within the outer plate, the trailing portions of the outer plate being sprung apart as necessary to permit such assembly. Starting with the inner plate offset below the outer plate the platelets 28 of the inner plate are projected through the slits of the outer plate, the slots 30, 31 of the outer plate facilitating this operation, the wing portions 31 in particular receiving the broadened width of the platelets 28 and enabling the two plates to be so assembled. As the interfitting proceeds toward completion the inner plate moves upward across the face of the outer plate until in the final position where the plates are fully assembled, they are in alinement and in the final position, as illustrated in Figs. 7, 8, 12 and 15, the platelets appear as a complete series upon the outer surface of the nose of the blade, those of the inner series 28 alternating with those of the outer series 26. They all project at relatively small angles to the plane of the plates as clearly illustrated in Fig. 15, and each spacer 32 and 33 of the outer and inner plates respectively occupies a position approximately midway of the platelet of the opposite series. This maintains the entire series of platelets spaced from each other and forms a series of flow passages 40 of generally arcuate shape extending on both sides of the nose of the blade, i. e., toward both the upper and lower blade surfaces, providing for a spanwise flow of fluid from the interior which is discharged in fully protective relation over the entire area of the nose. After leaving the nose the flow continues to follow the blade contour and furnishes protection for the entire blade contour on both the upper and lower surfaces.

The final operations include the brazing of the two plates to each other in a suitable copper or the like brazing operation, the passages 40 being suitably filled with a stop-off material to keep them open and prevent access of the brazing material thereto. The formed plate is then similarly assembled in and brazed to the base 10, forming the completed blade for the purpose described.

While the method and article herein described constitute preferred embodiments of the invention, it is to be understood that the invention is not limited to this precise method and article, and that changes may be made therein without departing from the scope of the invention which is defined in the appended claims.

What is claimed is:

1. A hollow blade for use in compressors, turbines and the like comprising a pair of sheet metal plates each having a pattern of generally arcuate slits intermediate the length thereof defining a plurality of platelets in each plate with said plates extending continuously from each side of said platelets forming the upper and lower surfaces of the blade, the body of each said plate laterally of said slits being formed generally to the shape of the blade contour with said platelets and slits located at the nose portion of the blade, said plates being superimposed with the platelets of one plate projecting through said slits of the other plate and alternating with the platelets thereof forming passages for the flow of a fluid therethrough.

2. A hollow blade for use in compressors, turbines and the like comprising a pair of sheet metal plates each having a pattern of generally arcuate slits intermediate the length thereof defining a plurality of integral platelets in each plate said platelets being deflected outwardly with their free ends projecting forwardly at an angle to a spanwise line passing through the undeflected portions of the nose of said blade, each said plate laterally of said slits extending continuously from both sides of said platelets forming the upper and lower surfaces of the blade, said plates being formed generally to the shape of the blade contour with said platelets and slits located at the nose portion of the blade, said plates being superimposed with the platelets of one plate projecting through and alternating with the platelets of the other said plate forming passages for the flow of a fluid therethrough to bathe and protect the nose of said blade.

3. A hollow blade for use in compressors, turbines and the like comprising a pair of sheet metal plates each having a pattern of generally arcuate slits intermediate the length thereof defining a plurality of platelets in each plate with said plates extending continuously from each side of said platelets forming the upper and lower surfaces of the blade, the body of each said plate laterally of said slits being formed generally to the shape of the blade contour with said platelets and slits located at the nose portion of the blade, said plates being superimposed with the platelets of one plate projecting through the slits of the other plate, and projecting means on one of said plates extending beyond the surface thereof for spacing the platelets of the other said plate to form passages for the flow of a fluid therethrough.

4. A hollow blade for use in compressors, turbines and the like comprising a pair of sheet metal plates each having a pattern of generally arcuate slits intermediate the length thereof defining a series of integral platelets in each plate, each said plate laterally of said slits extending continuously from both sides of said platelets forming the upper and lower surfaces of the blade, said plates being formed generally to the shape of the blade contour with said platelets and slits located at the nose portion of the blade, said plates being secured in superimposed relation with the platelets of one plate projecting through the slits of the other plate, and projecting means on one of said plates extending beyond the surface thereof for engaging an intermediate portion of a platelet of the other said plate and retaining said series of platelets in spaced relation with each other to form passages for the flow of a fluid therethrough.

5. A double wall hollow blade for use in compressors, turbines and the like comprising inner and outer sheet metal plates each having a nose portion and extending in continuous relation from said nose portion on both the upper and lower surfaces of said blade, tthe body portions of said outer sheet defining said upper and lower surface contours of the blade, each of said plates having a pattern of slits extending over the nose portion thereof defining platelets, the platelets of said inner plate projecting through the slits of and being exposed on the face of the outer plate forming a plurality of passages for the flow of a fluid in protecting relation over the nose of said blade.

6. A hollow blade for use in compressors, turbines and the like comprising inner and outer sheet metal plates, each said plate having a pattern of arcuate slits defining a series of platelets therein at an intermediate location, the remainder of both said plates extending continuously from said platelets and forming the main chordwise extending body of said blade on both the upper and lower surfaces of said blade with said platelets located at the nose thereof, said outer plate having slots adjacent said slits forming spaces, said plates being superimposed and the platelets of said inner plate projecting through said spaces in alternating relation with the platelets of said outer series and having portions exposed at the nose of said blade defining a series of passages for the flow of a fluid therethrough.

7. A hollow blade for use in compressors, turbines and the like comprising inner and outer sheet metal plates extending over both the upper and lower surfaces of said blade, each said plate having a pattern of slits defining a series of platelets, the platelets being deflected outwardly with their free ends projecting forwardly at an angle to a spanwise line passing through the undeflected portions of the nose of said blade, said plates being superimposed and the platelets of said inner plate projecting through said slits in alternating relation with the platelets of said outer series and being partially exposed at the outer surface of said blade, and projecting means on one of said plates extending beyond the surface thereof for spacing adjacent platelets from each other forming passages directed generally spanwise of the blade for the flow of a fluid therethrough.

8. A hollow blade for use in compressors, turbines and the like comprising inner and outer sheet metal plates, each said plate having a pattern of arcuate slits defining a series of platelets at an intermediate location, said outer plate having body portions laterally of said platelets shaped to form upper and lower blade surface contours thereof, said platelets being deflected outwardly with their free ends projecting forwardly at an angle to a spanwise line passing through the undeflected portions of the nose of said blade, said outer plate having slots adjacent said slits forming spaces, said plates being superimposed and the platelets of said inner plate projecting through said slots with portions of said inner platelets being exposed at the nose of said blade in alternating relation with said outer platelets, and projecting means on one of said plates extending beyond the surface thereof for spacing said alternating platelets from each other forming passages for the flow of a fluid therethrough for bathing the outer surface of said blade with a protective flow.

References Cited in the file of this patent

UNITED STATES PATENTS

| | | |
|---|---|---|
| 2,236,426 | Faber | Mar. 25, 1941 |
| 2,378,059 | Brauchler | June 12, 1945 |
| 2,405,190 | Darling | Aug. 6, 1946 |
| 2,431,647 | Mayne | Nov. 25, 1947 |
| 2,506,581 | Cowles | May 9, 1950 |
| 2,559,131 | Oestrich | July 3, 1951 |
| 2,568,726 | Franz | Sept. 25, 1951 |
| 2,585,871 | Stalker | Feb. 12, 1952 |
| 2,613,910 | Stalker | Oct. 14, 1952 |
| 2,613,911 | Clarke | Oct. 14, 1952 |